April 21, 1942.   S. MARCUS   2,280,244
DOLL EYE
Filed June 17, 1938
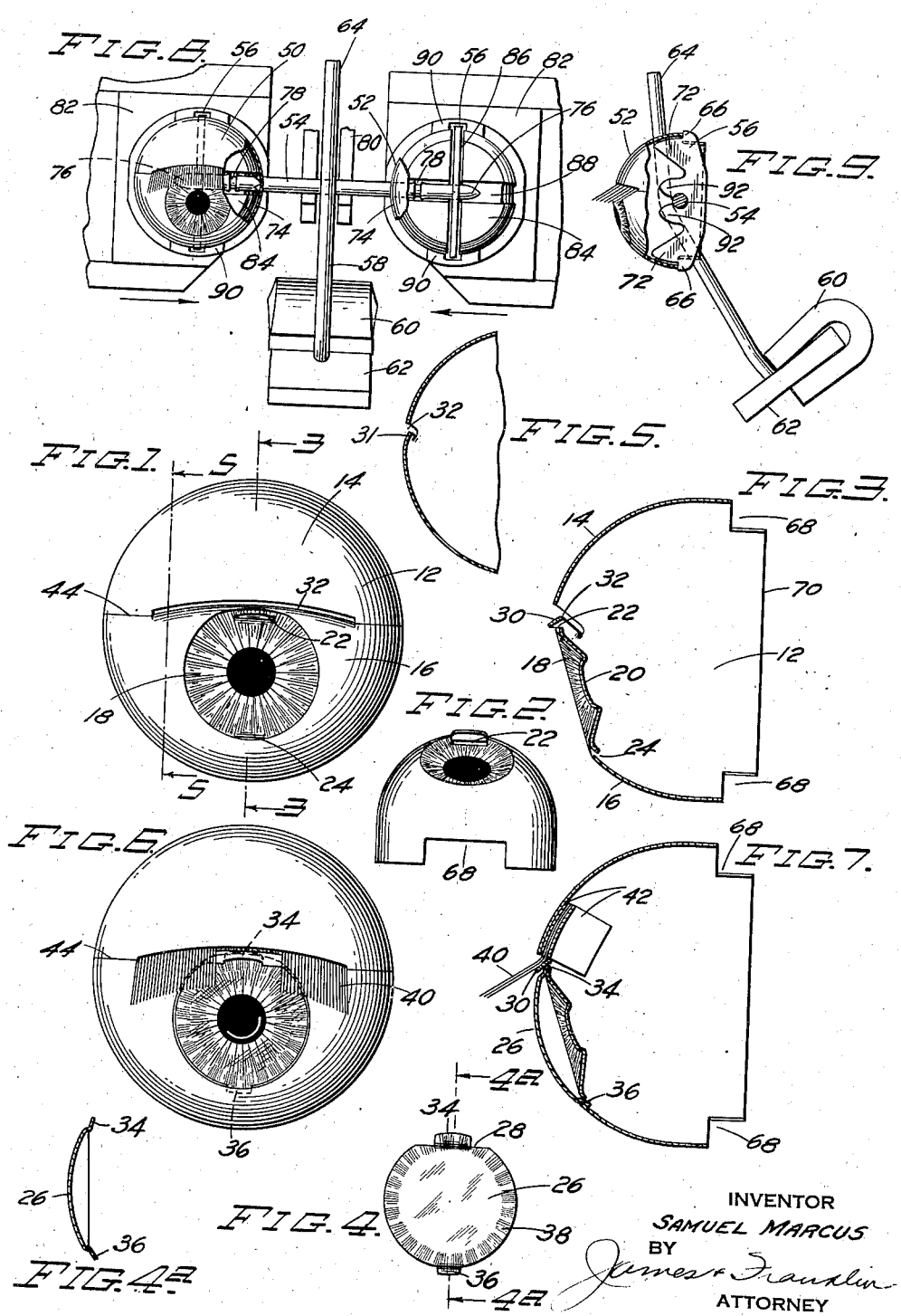
INVENTOR
SAMUEL MARCUS
BY
James F. Franklin
ATTORNEY Patented Apr. 21, 1942

2,280,244

UNITED STATES PATENT OFFICE 2,280,244

DOLL EYE

Samuel Marcus, Jersey City, N. J., assignor to Margon Corporation, Bayonne, N. J., a corporation of New Jersey Application June 17, 1938, Serial No. 214,189

11 Claims. (Cl. 46—165)

This invention relates to doll eyes.

The primary object of the invention is to generally improve doll eyes, especially of the movable type. Heretofore, doll eyes have been made in either inexpensive or expensive forms. The inexpensive form consisted simply of a sheet metal shell lithographed to simulate the pupil, iris, and eyeball portions of the eye. Those eyes lacked the lustre and depth of the more expensive forms. The latter were made of glass, or of sheet metal cut out at the center to receive a transparent lens, the lens being of substantial thickness and having a configuration at the rear differing from the curved or spherical configuration at the front. Some attempt has also been made at the use of a thin transparent covering, but in such case the covering extended entirely around the eye shell, or itself constituted the eye shell.

An object of the present invention is to provide a doll eye which is but very slightly more expensive than a simple sheet metal eye, yet which possesses a lustre and depth rivalling that of the expensive eyes heretofore made. The object is to produce an excellent doll eye which may be used with inexpensive dolls in place of the painted sheet metal eye heretofore employed in such dolls. To this end, the improved eye is made wholly of sheet material, and comprises a preferably lithographed sheet metal eye shell which, however, is indented at the iris and is surmounted by a transparent lens which is also made of sheet material, for example, sheet Celluloid. The lens is limited in area to the area of the iris, and is securely but inexpensively assembled with the eye shell by appropriate mechanical interlocking means.

In accordance with a further object of the invention, the eye is provided with an eyelash, and this is preferably secured in place without necessitating the use of a cement or adhesive.

Still further objects of the invention center about the assembly of a pair of eyes on an appropriate cross-rod or eye shaft. This assembly is made inexpensive by the use of a key frictionally mounted on the cross-rod at each eye. Provision is made for manual rotative adjustment of one eye relative to the other, and for an automatic self-adjustment of the spacing between the eyes. The eye shells are perforated to receive the cross-rod, and the perforation is made over-sized to permit the desired free movement of the eye on the shaft. In accordance with a feature and object of the present invention, the usual separate operation for perforating the eye shell is eliminated, and the cross-rod is itself used to perforate the eye shell while mounting the eye on the cross-rod. In accordance with still another feature and object of the invention, the perforation is made over-sized, although produced by the cross-rod itself, by preliminarily scoring or otherwise treating the cross-rod near its ends to produce an upset ring of metal or enlargement on the cross-rod which in passing through the wall of the eye shell, enlarges the opening therein to insure a free fit.

The method last set forth is not claimed herein, it forming the subject matter of a continuation application Serial No. 400,246, filed June 28, 1941.

To the accomplishment of the foregoing and other objects which will hereinafter appear, my invention consists in the doll eye elements and their relation to one another and to the cross-rod of the eye set, as hereinafter are more particularly described in the specification and sought to be defined in the claims. The specification is accompanied by a drawing in which:

Fig. 1 is a front elevation of a sheet metal eye shell forming the main part of the improved doll eye;

Fig. 2 is a view looking at the shell of Fig. 1 from the bottom;

Fig. 3 is a section taken in elevation through the shell in the plane of the line 3—3 of Fig. 1;

Fig. 4 is a front elevation of the lens used in the improved eye; Fig. 4a is a vertical section therethrough;

Fig. 5 is a section taken in the plane of the line 5—5 of Fig. 1, and shows the slit for the eyelash;

Fig. 6 is a front elevation of the complete eye with a part of the lash cut away to show the assembly of lens and eye shell;

Fig. 7 is a vertical section through the complete eye of Fig. 6;

Fig. 8 shows a pair of eyes assembled on a cross-rod and weight arm to form an eye assembly, and is explanatory of the method of mounting the eyes on the cross-rod; and Fig. 9 is a partially sectioned side elevation of the assembled eye set.

Referring to the drawing, and more particularly to Figs. 1, 2 and 3, the eye shell 12 is made of thin sheet metal, and is drawn to approximately hemispherical configuration. The sheet from which the eye shell is struck may be preliminarily lithographed with the desired coloration, and this includes a flesh colored portion 14 simulating an eyelid, a white colored portion 16 simulating an eye ball, and an iris portion 18 which is tinted brown or blue, or other color desired for the eye. The center of the iris portion is colored a deep black in simulation of the pupil of the eye. The coloration of the iris portion is not a solid, flat color, but preferably consists of numerous radial lines, the number of lines increasing toward the periphery of the iris, so that the coloration is comparatively light immediately around the pupil, but deepens toward the periphery of the iris. On inspection of Figs. 2 and 3, it will be seen that while the shell is generally hemispherical, the iris portion 18 is indented to frusto-conical configuration. The center of pupil portion 20 of the iris may be pressed outwardly somewhat in order to more clearly define the pupil portion.

The eye shell 12 is slotted at 22 and 24, these slots preferably being located at the top and bottom of the iris portion, the bottom slot 24 being located at the periphery of the iris portion, and the top slot being located slightly below the periphery of the iris portion.

Referring now to Figs. 4 and 4a, the lens 26 is stamped out of a suitable transparent sheet material, preferably ordinary sheet Celluloid. It is generally circular in configuration, and has a diameter equal to the diameter of the iris portion 18 of the eye shell. When, as in the present case, the eye is to be provided with an eyelash, the iris portion is flattened somewhat at the top, and in such case the lens is matingly flattened at the top, as is indicated at 28. It may be mentioned that it is also because the present eye is provided with an eyelash, that the top slot 22 (Figs. 1 and 3) is disposed slightly below the top of the iris portion in order to leave a strip of metal 30 between slot 22 and the eyelash slot 32. Reverting to Figs. 4 and 4a, the lens is provided with upwardly and downwardly projecting tongues 34 and 36, and these are dimensioned to be received within the slots 22 and 24. They are preferably offset or stepped inwardly somewhat, as is shown in Fig. 4a, thus bringing the outer surface of the lens flush with the outer surface of the eyeshell, as is shown in Fig. 7. The lens 26 is pressed into convex shape, as is clearly shown in the drawing. The curvature of the lens may be made to conform to a sphere having the same radius of curvature as the eye shell. It will be understood that to assemble the lens and eye shell together, it is merely necessary to spring the lens enough to slip the tongues 34 and 36 into the mating slots of the eye shell. No further holding means is needed, but is desired, the edge of the lens may be touched with a suitable solvent, thus providing a cemented connection between the lens and eye shell. It should be understood that the dimension of the lens is such that it is received within the periphery of the iris portion of the eye, so that the outer surface of the shell is substantially a smooth, flush surface.

While not essential, I find it desirable to lithograph the periphery of the lens with a ring of coloration, as is indicated at 38 in Fig. 4. This coloration may be lithographed on large sheets of Celluloid before stamping the individual lenses therefrom. The coloration is preferably provided on the back of the lens, thus protecting it. This additional coloration is desirable in order to intensify and deepen the coloration of the eye near the periphery of the iris, and it is also desirable in order to insure against any possibility of reflection from the inside surface of the eye at the edge of the lens. The coloration on the lens may be made blue for use with a blue eye, or brown for use with a brown eye, or it may be made a dark grey or neutral color for use with either type of eye.

The eyelash consists of strands of hair 40, the inner ends of which are anchored in a suitable base or foundation consisting, for example, of strips of paper 42 between which the lash strands are cemented. The slit 32 for the lash connects the line of demarcation 44 between the flesh-colored or eyelid portion 14 of the shell and the white or eyeball portion 16 of the shell. The slit is preferably made by turning the lower edge of the metal inwardly, as is indicated at 31 in Fig. 5, and 30 in Figs. 3 and 7. In this way the slit may be opened to substantial dimension, as though cutting a slot through the metal, but the ledge of metal at the bottom of the slit is retained and may be used to clamp the lash securely in place so that it will be held without the use of adhesive or cement, although such material may be used if desired. The relatively thick lash foundation 42 prevents the lash from being pulled out of the slit 32. The inturned ledge of metal 30, 31 functions to some extent to support and bend the lash strands outwardly so that they project out of the eye, as shown in Fig. 7, instead of lying along the surface thereof.

The eye assembly is shown in Figs. 8 and 9, and comprises the eyes 50 and 52 mounted on the ends of the cross-rod 54 with the aid of keys 56, said cross-rod 54 having welded or otherwise secured thereto, a weight arm 58 carrying at its lower end a weight 60. This consists of a reversely bent piece of metal and carries a forwardly projecting piece of cardboard 62 which acts as a bumper striking the front wall of the doll head when the eyes move to open position. The upper end of the weight arm 58 may be extended as indicated at 64 to form a motion-limiting stop to limit the closing movement of the eyes, just as the bumper 62 limits the opening movement of the eyes.

The eyes are caused to rotate with cross-rod 54 by means of the keys 56. These are received with a tight frictional fit on the cross-rod and are provided with shoulders 66 which bear against the rear edge of the eye shell. The latter is notched or cut away to receive the shoulders 66, as is best shown at 68 in Figs. 2, 3 and 7. It is important that the eye be centered with respect to the cross-rod 54, and while the main rear edge 70 of the eye may vary somewhat in dimension and location, and may be rough or uneven, the recessed edges 68 at the top and bottom of the eye shell are located exactly in the plane of the center of the eye shell and mate correctly with the shoulders 66 of keys 56. It will be understood that the keys cause the eyes to turn with the shaft, and that the rotative position of the eyes on the shaft may be varied by manually turning the eye and key on the shaft. This permits adjustment of one eye relative to the other, and permits both eyes to be properly adjusted in the eye openings of the doll head while the weight of the eye set is moved to its limiting position against the doll head. By means of this adjustment, the lashes may be caused to rest against the upper edges of the eye opening in the head when the eyes are open.

In the present construction, the perforations through the side wall of the eye for receiving the cross-rod 54 are made over-sized to insure a loose fit of the eye on the cross-rod. Moreover, the notches 68 are made substantial in side to side dimension, as is clearly shown in Fig. 2. This permits a limited sideward movement of the eyes on the cross-rod, the limit of motion being determined by the inwardly projecting fingers 72 of the keys 56, which are made somewhat closer than the maximum dimension from top to bottom in the eye. In this way an automatic adjustment of the distance between eyes will take place so that the eyes will accommodate themselves to the eye openings in the doll head.

In accordance with the present invention, the openings in the inner walls 74 of the eyes are made by the cross-rod 54. With this object in view, the ends of the cross-rod are preferably pointed, as shown at 76. A short distance in from the ends, the cross-rod is so treated as to form an enlargement or raised ring of metal therearound. In the present case this is done by simply scoring the cross-rod inwardly at 78, thereby displacing some metal outwardly at each side of the scoring 78. This scoring is located between the key 56 and the wall 74 of the eye, so that in forcing the cross-rod through the eye, the enlargement is also forced through the wall of the eye, thus making the opening in the eye large enough to insure a free fit of the eye on the cross-rod.

The manner in which the eyes are assembled on the cross-rod may be explained with reference to Fig. 8. A suitable fixture or tool is provided having a support 80 for receiving the cross-rod 54 and weight arm 58 and anchoring these against movement. The tool includes slides 82 which are movable toward or away from the support 80. In Fig. 8 they are shown in inward position, but at the beginning of the assembly operation, the slides 82 are to be assumed to be in their outward position beyond the ends of the cross-rod 54. Each slide has formed thereon a supporting projection 84 which is shaped to receive the eye member therearound. Generally speaking, the projection 84 is spherically surfaced to receive the eye shell, but the top is cut away or flattened somewhat in order to provide ample clearance for the indented iris portion and the eyelash foundation, etc. The projection 84 is slotted in one direction at 86 to receive the key 56. It is slotted in the other direction at 88 to receive the cross-rod. It is provided with ledges or steps at 90 to receive the notches or recesses 68 of the eye shell.

In practice, a cross-rod and weight arm assembly is placed on support 80, keys 56 are placed in slots 86, and eyes are placed over the supports 84. The slides 82 are then moved together, thus forcing the ends of the cross-rod through the walls of the eye shells, and further driving the ends of the cross-rod into the keys 56. The keys have previously been stamped to the configuration shown in Fig. 9, and are provided with a hole for receiving the cross-rod. This hole is preferably slotted at one side and is formed between the lugs 92 shown in Fig. 9, thereby providing a resilient frictional grip on the cross-rod. The assembled eye set is then lifted from the tool and is ready for use.

It is believed that the construction of my improved eye, as well as the method of manufacturing and assembling the parts thereof together and to the cross-rod of the eye set, will be apparent from the foregoing detailed description thereof. The eye shell is stamped from thin sheet metal which is easily drawn to the desired hemispherical or cup shape, and which is readily punched by the cross-rod during the subsequent assembly operation. This sheet metal is preferably printed or lithographed in advance, so that the shell as it leaves the press is already appropriately colored. The iris portion is readily indented the necessary amount for an eye of substantial apparent depth, this resulting from the fact that a moderate amount of indentation as shown in Fig. 3, results in a large displacement from the convex lens as shown in Fig. 7. The lens is merely a disc which is readily punched from thin transparent stock made, for example, of Celluloid, cellulose acetate, or like material. Here also the stock may be previously printed or lithographed, so that the stamped lens will have the peripheral coloration shown in Fig. 4.

The eye is made wholly of inexpensive sheet material. A minimum amount of material is used, the area of the lens, for example, being limited to the area of the iris. The eye and eye assembly are made up of a minimum number of parts, and this reduces the cost of material and also the expense of assembly. The construction is such that the lens and the lash may each be held in place without necessitating the use of cement, and this again reduces the cost of manufacture. The eyelash fulfills its primary function as a lash, and in addition, is useful in concealing the top tongue connection of the lens. The bottom tongue is so fashioned and so located that it is not noticeable.

Despite the simple and inexpensive character of the present eye set, it nevertheless makes possible the desirable eye adjustments, including a manual rotative adjustment and an automatic axial adjustment of the eyes, and the eye itself is characterized by a lustre and depth which compares very favorably with that of the most expensive forms of doll eye.

It will be apparent that while I have shown and described my invention in a preferred form, many changes and modifications may be made in the structure disclosed, without departing from the spirit of the invention defined in the following claims.

I claim:

1. A doll eye comprising a generally hemispherical sheet metal shell having a portion indented in frusto-conical form to substantial depth, means on said indented portion to simulate a pupil and iris, and a small transparent lens made of sheet Celluloid by like material, said lens being dimensioned to fit in the aforesaid indented portion and having a convex curvature to complete the generally hemispherical shape of the eye, said lens being provided at its edge with a plurality of projecting tongues, and said shell being provided with mating slots to receive said tongues.

2. A doll eye comprising a generally hemispherical sheet metal shell having a portion indented, means on said indented portion to simulate a pupil and iris, and a small transparent lens made of sheet Celluloid or like material, said lens being dimensioned to fit in the aforesaid indented portion and having a convex curvature to complete the generally hemispherical shape of the eye, said lens being provided at the top and bottom with projecting tongues, and said shell being provided with mating slots to receive said tongues.

3. A doll eye comprising a generally hemispherical sheet metal shell having a portion indented at the iris and pupil, and a small lens made of sheet Celluloid or like material, said lens being dimensioned to fit in the aforesaid indented portion and having a convex curvature to complete the generally hemispherical shape of the eye, said lens being provided at the top and bottom with projecting tongues, and said shell being provided with mating slots to receive said tongues, said shell further having a slit extending transversely at the top of the indented portion, there being a small bridge of metal between the upper slot and said slit, and an eyelash received in and projecting through said slit.

4. A doll eye comprising a generally hemispherical sheet metal shell having a portion thereof indented, said shell being colored to simulate eyeball and eyelid portions, and said indented portion being colored to simulate a pupil and iris, and a small transparent lens made of sheet Celluloid or like material, said lens being dimensioned to fit in the aforesaid indented portion and having a convex curvature to complete the generally hemispherical shape of the eye, said lens and shell having mating parts which mechanically interlock to hold the same together.

5. A doll eye comprising a generally hemispherical sheet metal shell having a portion thereof indented, said shell being colored to simulate eyeball and eyelid portions, and said indented portion being colored to simulate a pupil and iris, and a small transparent lens made of sheet Celluloid or like material, said lens being dimensioned to fit in the aforesaid indented portion and having a convex curvature to complete the generally hemispherical shape of the eye, said lens being provided at its edge with a plurality of projecting tongues, and said shell being provided with mating slots to receive said tongues, the edge of said lens portion being colored to accentuate the coloration of the iris portion of the eye.

6. A doll eye comprising a generally hemispherical sheet metal shell having an iris portion indented, said iris portion being circular but flattened at the top, said shell being colored to simulate eyeball and eyelid portions, and said indented portion being colored to simulate a pupil and iris, and a small transparent lens made of sheet Celluloid or like material, said lens being shaped and dimensioned to fit in the aforesaid indented portion and having a convex curvature to complete the generally hemispherical shape of the eye, said shell having a slit extending transversely between the eyelid and eyeball portions immediately above the flattened top of the iris portion, an eyelash received in and projecting through said slit, said slit holding the eyelash in position.

7. A doll eye comprising a generally hemispherical sheet metal shell having a portion indented, said shell being colored to simulate eyeball and eyelid portions, and said indented portion being colored to simulate a pupil and iris, and a small transparent lens made of sheet Celluloid or like material, said lens being dimensioned to fit in the aforesaid indented portion and having a convex curvature to complete the generally hemispherical shape of the eye, said lens being provided at the top and bottom with projecting tongues which are offset inwardly from the lens, and said shell being provided with mating slots to receive said tongues.

8. A doll eye comprising a generally hemispherical sheet metal shell having a portion indented, said shell being colored to simulate eyeball and eyelid portions, and said indented portion being colored to simulate a pupil and iris, and a small transparent lens made of sheet Celluloid, said lens being dimensioned to fit in the aforesaid indented portion and having a convex curvature to complete the generally hemispherical shape of the eye, said lens being provided at the top and bottom with projecting tongues, and said shell being provided with mating slots to receive said tongues, said shell further having a slit extending transversely between the eyelid and eyeball portions, there being a small bridge of metal between the upper slot and said slit, and an eyelash received in and projecting through said slit.

9. A doll eye assembly comprising sheet metal eyes, a cross-rod on which said eyes are loosely mounted, small parts of said cross-rod being peripherally enlarged to a diameter greater than the normal diameter of the cross-rod, walls of said eyes having holes with a diameter equalling that of the enlarged parts of the cross-rod, said walls resting on the normal parts of the cross-rod.

10. A doll eye assembly comprising sheet metal eyes, a cross-rod on which said eyes are mounted, said eyes and cross-rod being relatively movable in the direction of the cross-rod to afford self-adjustment of the spacing between the eyes, keys received on said cross-rod and bearing against said eyeshells for causing the eyeshells to rotate with the cross-rod, the ends of said cross-rod being pointed, small parts of said cross-rod between the keys and the inside walls of the eyes being peripherally enlarged to a diameter greater than the normal diameter of the cross-rod, said inner walls of the eyes having holes with a diameter equalling that of the raised parts of the cross-rod.

11. A doll eye assembly comprising sheet metal eyes, a cross-rod on which said eyes are mounted, said eyes and cross-rod being relatively movable in the direction of the cross-rod to afford self-adjustment of the spacing between the eyes, keys received on said cross-rod and bearing against said eyes for causing the eyes to rotate with the cross-rod, said keys being frictionally received on the cross-rod with a fit tight enough to cause the keys and eyes to rotate with the cross-rod during operation of the eye assembly, but permitting manual rotational adjustment of the position of the eyes on the cross-rod, the ends of said cross-rod being pointed, small parts of said cross-rod between the keys and the inside walls of the eyes being peripherally indented and raised or annularly enlarged adjacent the said indentations to a diameter greater than the normal diameter of the cross-rod, said inner walls of the eye having holes with a diameter equalling that of the raised or annularly enlarged parts of the cross-rod.

SAMUEL MARCUS.